United States Patent [19]

Stignani et al.

[11] Patent Number: 4,924,588
[45] Date of Patent: May 15, 1990

[54] TOOL FOR THE NON-DESTRUCTIVE REMOVAL OF TUBES FROM HEAT EXCHANGERS

[75] Inventors: Renato Stignani; Francesco Ferrari, both of Mantova, Italy

[73] Assignee: Montedipe S.p.A., Milan, Italy

[21] Appl. No.: 941,087

[22] Filed: Dec. 12, 1986

[30] Foreign Application Priority Data

Dec. 18, 1985 [IT] Italy .................. 23265 A/85

[51] Int. Cl.⁶ .................. B23B 41/10; B23C 3/00
[52] U.S. Cl. ...................... 29/726; 408/54; 408/82; 409/143
[58] Field of Search ............ 29/426.4, 426.5, 157.3 C, 29/402.08, 402.03, 726; 165/76; 408/54, 79, 82, 150; 409/143; 155/55.2

[56] References Cited

U.S. PATENT DOCUMENTS

| | | | |
|---|---|---|---|
| 1,795,553 | 3/1931 | Getty | 166/55.2 X |
| 2,000,824 | 5/1935 | Crockett | 30/104 |
| 2,341,322 | 2/1944 | Hubbell | 408/79 X |
| 2,401,490 | 6/1946 | Little | 408/79 X |
| 2,834,106 | 5/1958 | Conder | 30/92.5 |
| 2,949,064 | 8/1960 | Adcock | 409/143 |
| 3,729,806 | 5/1973 | Bronne et al. | 29/427 |
| 3,979,816 | 9/1976 | Green | 29/157.3 C X |
| 4,646,413 | 3/1987 | Nall et al. | 29/426.42 |

FOREIGN PATENT DOCUMENTS

| | | | |
|---|---|---|---|
| 924984 | 3/1955 | Fed. Rep. of Germany . | |
| 0053112 | 3/1984 | Japan | 409/143 |
| 854610 | 11/1979 | U.S.S.R. . | |

Primary Examiner—Z. R. Bilinsky
Attorney, Agent, or Firm—Stevens, Davis, Miller & Mosher

[57] ABSTRACT

Method for the non-destructive removal of tubes or of portions of tubes from heat exchangers, comprising:
(a) the lengthwise cutting along at least one generatrix of one tube or of a plurality of tubes of said exchanger, to a depth at least equal to the thickness of the tube plate and to a width of up to 2% of the outer perimeter of the tubes;
(b) the approaching to each other of the edges of the so-obtained cut section up to the complete release of the tube, or of the tubes, from the tube plate;
(c) the possible crossways cutting of the tube, or of the tubes, to a height at least equal to double the thickness of the tube plate; and
(d) the recovery of the tube, or of the tubes, by sliding same out of the said plate.

12 Claims, 2 Drawing Sheets

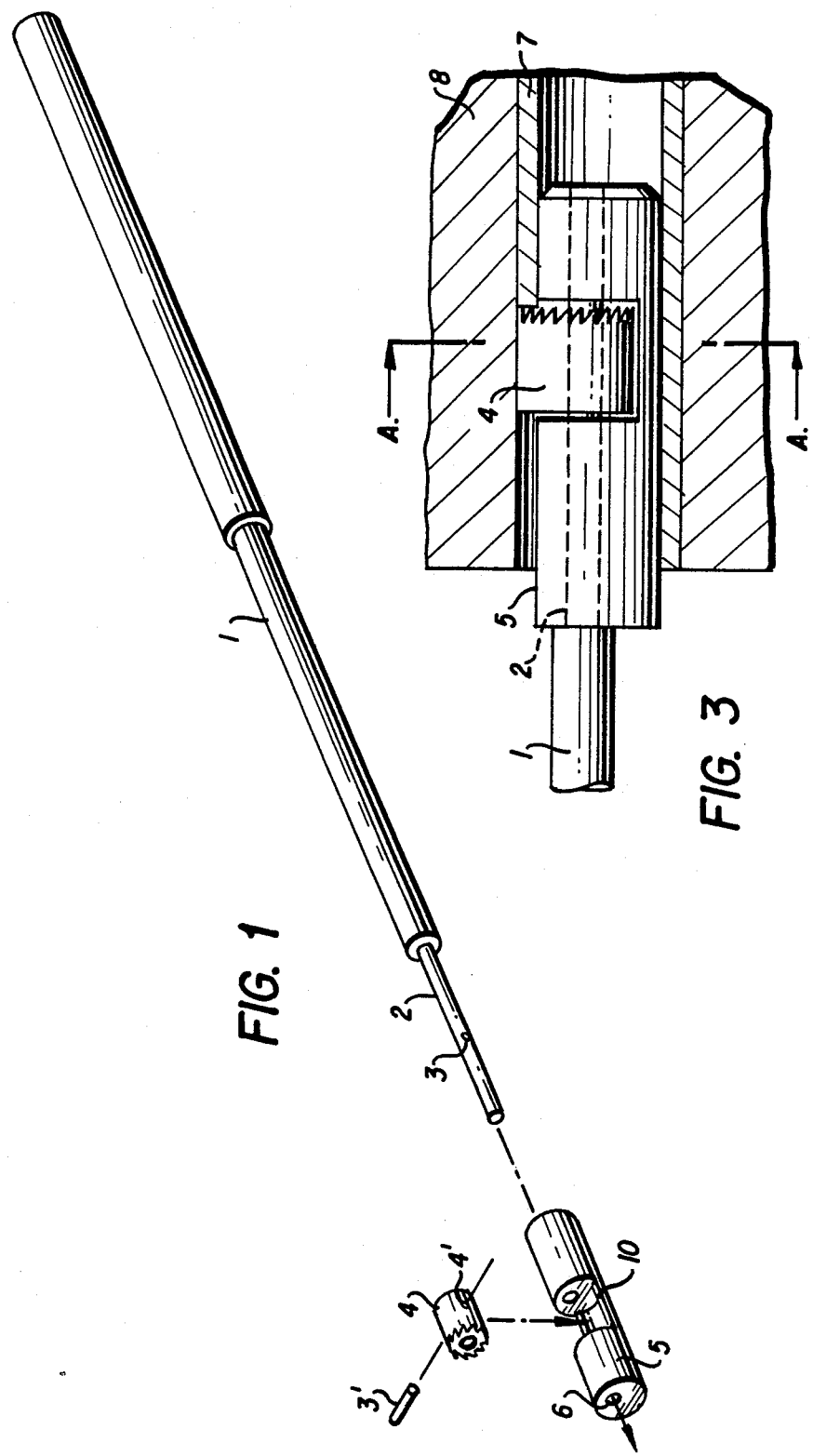

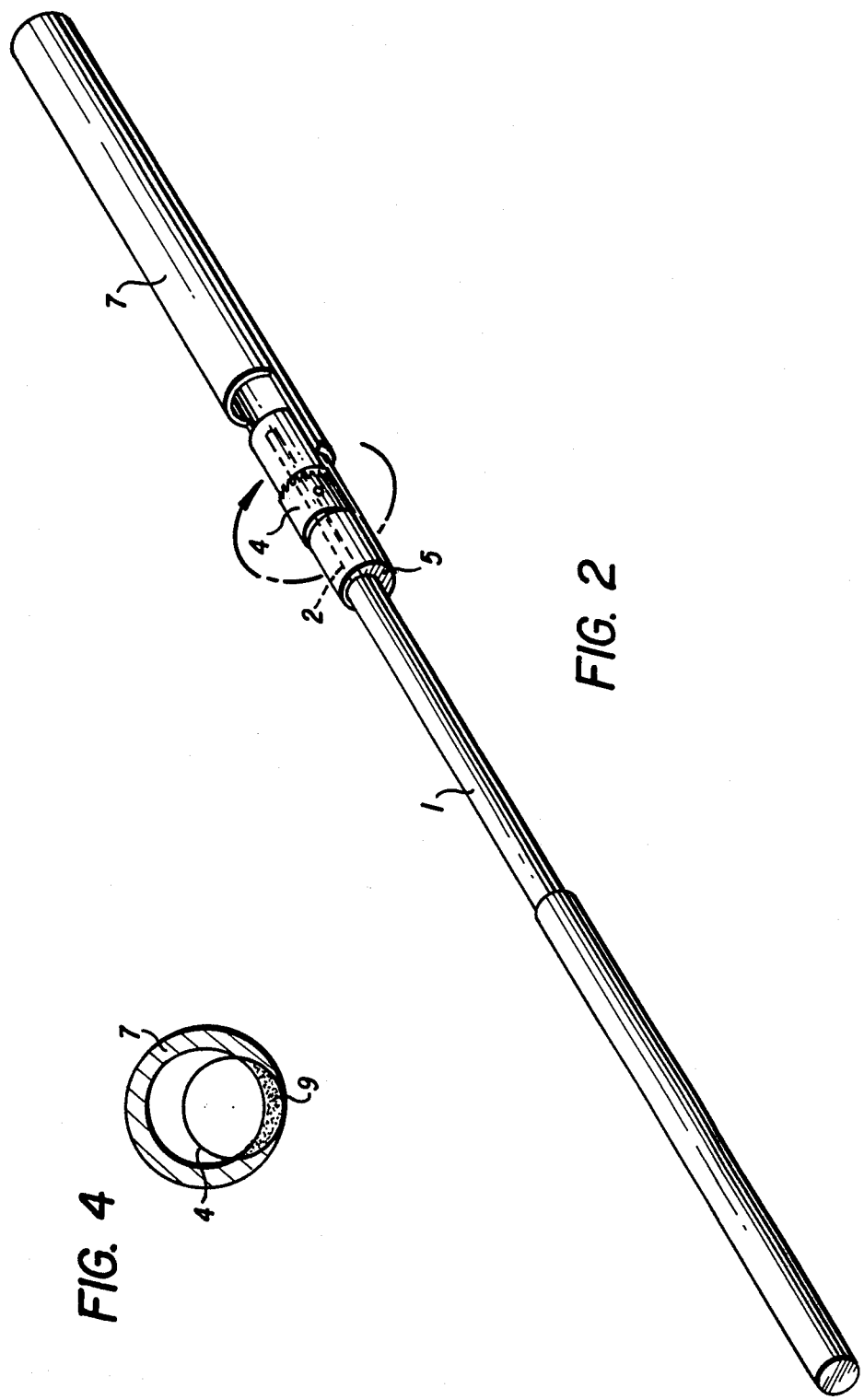

TOOL FOR THE NON-DESTRUCTIVE REMOVAL OF TUBES FROM HEAT EXCHANGERS

DESCRIPTION OF THE INVENTION

The present invention relates to a method for the removal of tubes from heat exchangers.

More particularly, the present invention relates to a method for the removal of tubes, or of portions of tubes, from nested-tube heat exchangers with "U"-shaped tubes, or with straight rolled and/or welded tubes, without destroying the extreme end portions inserted inside the tube plate.

Nested-tube heat exchange devices, widely used in chemical industry, often show corrosion phenomena.

Hence, techniques for non-destructive checks have been developed, by which detecting the progress of the corrosion inside the heat exchanger tube and/or on the outer surfaces thereof, both from a qualitative and from a quantitative viewpoint, have become possible.

But by these techniques, which use inspection systems based on the use of induced currents, ultrasounds, X-rays, and so forth, ascertaining and checking the actual conditions occurring inside the tube/tube-plate or tube/baffle air gap is not possible, precisely because of the air gap, the limited accessibility, the outer metal mass, and the variation in diameter of the rolling area.

The methods proposed to date provide for checking the development of corrosion in the tubes of heat exchangers by comparing the on-line heat exchanger to pre-existing models that have tubes or tube portions which have undergone a complete corrosion cycle, or which possess artificially built-in faults, on the basis of morphological knowledge.

But, for the tube lengths located inside the tube plates, this type of check could not be carried out, also because of the lack of comparison models, due to the fact that for the purpose of removing a tube from a nested-tube heat exchanger by the techniques of the prior art, destroying the portion connected to and fastened onto the tube plate was necessary.

An object of the present invention is that of providing a method for the removal of tubes, or of tube portions, from heat exchangers which does not show the above-mentioned drawback.

More particularly, an object of the present invention is that of providing a method for the removal of tubes, or of tube portions, from heat exchangers which does not require the destruction of the tube length located inside the tube plate.

Still another object of the present invention is that of providing a tool for carrying out the non-destructive removal of tubes, or of tube portions, from heat exchangers.

It has now, surprisingly, been found that these and further objects of the invention are achieved by a method for the non-destructive removal of tubes or of portions of tubes from heat exchangers, comprising:

(a) the lengthwise cutting along at least one generatrix of one or of a plurality of tubes of said exchanger, to a depth at least equal to the thickness of the tube plate and to a width of up to 2% of the outer perimeter of the tubes;

(b) the approaching to each other of the edges of the so-obtained cut section up to the complete release of the tube, or of the tubes, from the tube plate;

(c) the possible crossways cutting of the tube, or of the tubes, to a height at least equal to double the thickness of the tube plate; and (d) the recovery of the tube, or of the tubes, by sliding same out of the said plate.

Should the tubes of the heat exchanger be fastened onto the plate, besides by rolling, also by inner and/or outer welding, according to the method of the present invention an initial step must be performed, consisting in the complete destruction of such a weld, by chisel, or by a mechanical means, such as, e.g., by a pneumatic hammer, by a guided auger bit, or by a milling cutter, and so on.

Step (a) of the method of the present invention is carried out by a suitable tool, which can be driven with a normal electric or pneumatic drill.

Another object of the present invention to provide a tool for the non-destructive removal of tubes, or of tube portions, from heat exchangers. Said tool comprises:

(a) a milling-cutter-holder shank, at least equal in length to the depth of the cutting to be accomplished in the tube, and provided with a fastening means;

(b) a guide sleeve constituted by a cylinder provided with a longitudinal bore, inserted, on the milling-cutter-holder shank, and provided with an opening for housing a milling cutter, said longitudinal bore being offset relatively to the axis by a length at least equal to the thickness of the tube to be removed; and (c) an end milling cutter housed inside the opening of the guide sleeve, and rigidly fixed onto the milling-cutter-holder shank.

The milling-cutter-holder shank may be constituted either by a constant-section metal shaft, or by two metal shafts having different sections, rigidly connected to each other, and lying on the same axis. The shaft which is of lesser cross-sectional surface area is provided with fastening means, and on it is inserted the guide sleeve.

The milling-cutter-holder shank constituted by two shafts can be preferably obtained by the lathe-machining of a constant-section metal shaft.

The two shafts which form the milling-cutter-holder shank have an $L_A/L_B$ ratio—where $L_A$ is the length of the lesser cross-sectional surface-area shaft and $L_B$ is the length of the greater cross-sectional surface-area shaft—within the range of from 0.1 to 1; and a $D_A/D_B$ ratio—where $D_A$ is the diameter of the lesser cross-sectional surface-area round and $D_B$ is the diameter of the greater cross-sectional surface-area shaft—within the range of from 0.1 to 1.

When the $D_A/D_B$ ratio is equal to 1, the tool of the present invention is provided on the milling-cutter-holder shank with a shoulder, for the purpose of preventing the guide sleeve from sliding. The milling-cutter-holder shank is generally constituted by carbon steel, with a carbon content within the range of from 0.02 to 1.5% by weight. Other metals, such as stainless steel, or special alloy steel, or non-ferrous metal alloys may be used as well.

The guide sleeve has an outer diameter slightly shorter than the inner diameter of the tube which is to be removed from the heat exchanger, but longer than the diameter of the milling-cutter-holder shank. Said sleeve may be of any length, although a length about equal to that of the lesser cross-sectional surface-area shaft is preferred.

The opening in the guide sleeve may be provided in any part thereof, on condition that it coincides, when the sleeve is inserted on the milling-cutter-holder shank, with the fastening means. In said opening is inserted the milling-cutter, the teeth of which protrude by a length equal to the thickness of the tube to be extracted.

The offset of the longitudinal bore of the guide sleeve relatively to its own axis is equal to the thickness of the tube if the diameter of the milling cutter is identical to that of the same sleeve, or is equal to the thickness of the tube, increased by the difference in diameters, if the milling cutter has a diameter less than that of the sleeve.

The guide sleeve may also be constituted by any type of metal or of metal alloys, although bronze is the most preferred material.

The milling cutter may be of steel or of other suitable metal alloy.

For the purpose of still better understanding of the construction and arrangement of the tool of the instant invention, a description thereof in still greater detail is given, referring to the figures of the attached drawing wherein:

FIG. 1 shows a perspective schematic exploded view of the tool of the present invention;

FIG. 2 shows a perspective schematic view of the tool in its operating position inside the tube to be removed;

FIG. 3 shows a longitudinal sectional view of the tool in its operating position inside the tube; and FIG. 4 shows a transversal sectional view of FIG. 3, on a plane passing along AA.

Referring to these figures, the tool of the present invention comprises:

a milling-cutter-holder shank constituted by a shaft or bar of greater cross-sectional surface area (1), which is applied to the operating machine;

a shaft or bar of lesser cross-sectional surface area (2), provided with fastening or pinning means (3) and (3');

a guide sleeve (5) provided with an opening (10) and with a longitudinal bore (6); and an end milling cutter (4), provided with a bore (4') for rigid connection to the milling-cutter-holder shank via 3'.

The milling cutter (4) is housed inside the opening (10) of the guide sleeve (5), and the whole assembly is applied on shaft (2).

While the sleeve (5) remains free, the milling cutter is rigidly attached to the shaft by means of pin (3'), which is inserted into the two bores (3) and (4).

The longitudinal bore (6) of the guide sleeve, by being offset relative to the axis by a length at least equal to the thickness of tube (7) fastened to the tube plate (8), see FIG. 3, allows the teeth of milling cutter (4) to protrude by a length identical to its offset and thus in operation to cut the tube according to the intersection (9), see FIG. 4.

During the operation of the tool, the milling-cutter-holder shank is connected to an operating machine, such as, e.g., a drill, and the milling-cutter-housing guide sleeve is slid inside the tube.

On actuating the drill, the milling cutter, which operates on its end, removes a portion of the tube, and the guide sleeve, by not being constrained to the milling-cutter-holder shank, does not rotate and thus allows the milling cutter to cut a straight length of tube.

What is claimed is:

1. A tool for the non-destructive removal of tubes, or of tube portions, from heat exchangers, comprising:

(a) a milling-cutter-holder shank, at least equal in length to the depth of the cutting to be accomplished in the tube;

(b) a guide sleeve comprising a cylinder having a longitudinal bore, and a lateral opening intermediate its ends for housing a milling cutter, said longitudinal bore being offset relative to a longitudinal central axis of said guide sleeve by a length at least equal to the thickness of the tube to be removed and said shank slidably receiving said guide sleeve by insertion into said bore;

(c) an end milling cutter having an axially facing cutting means on a tube contacting end thereof to cut a straight length of tube, said end milling cutter being housed inside the opening of the guide sleeve; and means for rigidly fastening said milling cutter to the milling cutter-holder shank.

2. Tool according to claim 1, wherein the milling-cutter-holder shank is constituted by a constant-section metal shaft.

3. Tool according to claim 1, wherein the milling-cutter-holder shank is constituted by two metal shafts having different cross-sectional surace areas, rigidly connected to each other and lying in the same axis.

4. Tool according to claim 3, wherein the shaft of lesser cross-sectional surface area is provided with the fastening means, and on said shaft the guide sleeve is inserted.

5. Tool according to claim 3 or claim 4, wherein the milling-cutter-holder shank is obtained by lathe-machining a constant-section metal shaft.

6. Tool according to claim 3 or claim 4, wherein the $L_A/L_B$ ratio—where $L_A$ is the length of the shaft with the lesser cross-sectional surface area and $L_B$ is the length of the shaft with the greater cross-sectional surface area—is within the range of from 0.1 to 1.

7. Tool according to claim 2, wherein the milling cutting holder shank comprises a first metal shaft having a first cross-sectional area and a second metal shaft having a second cross-sectional area, rigidly connected to each other and lying in the same axis and the $D_A/D_B$ ratio, where $D_A$ is the diameter of the first shaft and $D_B$ is the diameter of the second shaft, is within the range of from 0.1 to 1.

8. Tool according to claim 7, wherein, when the $D_A/D_B$ ratio is equal to 1, the milling-cutter-holder shank is provided with a shoulder for the purpose of preventing the guide sleeve from sliding.

9. Tool according to claim 1, wherein the guide sleeve has an outer diameter slightly smaller than the inner diameter of the tube to be removed, and larger than the diameter of the milling-cutter-holder shank.

10. Tool according to claim 1, wherein the guide sleeve has a length preferably equal to the length of the shaft having the lesser cross-sectional surface area.

11. Tool according to claim 1, wherein the opening of the guide sleeve coincides, when the sleeve is applied on the milling-cutter-holder shank, with the fastening means.

12. Tool according to claim 1, wherein the offset of the longitudinal bore of the guide sleeve relative to its own axis is equal to the thickness of the tube if the diameter of the end milling cutter is identical to that of the same sleeve, or is equal to the tube thickness increased by the difference of diameters if the end milling cutter has a diameter less than that of the sleeve.

* * * * *